United States Patent [19]
Hassan et al.

[11] Patent Number: 6,019,922
[45] Date of Patent: Feb. 1, 2000

[54] POWDER-FREE MEDICAL GLOVES

[75] Inventors: Noorman Abu Hassan, Selangor Darul Ehsan; Chak Choy Yuen, Kuala Lumpur, both of Malaysia

[73] Assignee: Johnson & Johnson Mfg Sn Bhd, Malaysia

[21] Appl. No.: 09/163,696

[22] Filed: Sep. 30, 1998

[51] Int. Cl.$^7$ .............................. B29C 41/14; B29C 41/22
[52] U.S. Cl. ...................... 264/130; 264/232; 264/233; 264/255; 264/306; 264/307; 264/308
[58] Field of Search ...................................... 264/301, 304, 264/306, 308, 305, 307, 130, 232, 233, 255

[56] References Cited

U.S. PATENT DOCUMENTS

| | | | |
|---|---|---|---|
| 3,856,561 | 12/1974 | Esemplare et al. | 264/306 |
| 3,919,442 | 11/1975 | Esemplare . | |
| 4,143,109 | 3/1979 | Stockum . | |
| 4,499,154 | 2/1985 | James et al. . | |
| 4,947,839 | 8/1990 | Clark et al. | 427/2 |
| 5,088,125 | 2/1992 | Answell et al. . | |
| 5,284,607 | 2/1994 | Chen . | |
| 5,304,337 | 4/1994 | Chen et al. | 264/304 |

Primary Examiner—Mathieu D. Vargot
Attorney, Agent, or Firm—Andrew C. Farmer; Theodore J. Shatynski

[57] ABSTRACT

A powder free medical glove having an outer side a silicon treated surface and the inside of cross linked coagulated glove bonded with a layer formed of an anti-blocking composition. The anti-blocking composition includes of a polymer or copolymer mixed together with a micronised high density polyethylene material and wax in suitable blends that result in the composition having anti-blocking and improved lubricity properties. The medical glove with the skin contacting anti-blocking coating enables donning of the glove to be effected without the aid of donning powder such as starch powder. When the finished glove is washed and rinsed with water to remove the coagulant powder, and the said glove treated with a silicon solution, a glove substantially free of loose powder glove is produced and has good lubricity for donning.

6 Claims, 1 Drawing Sheet

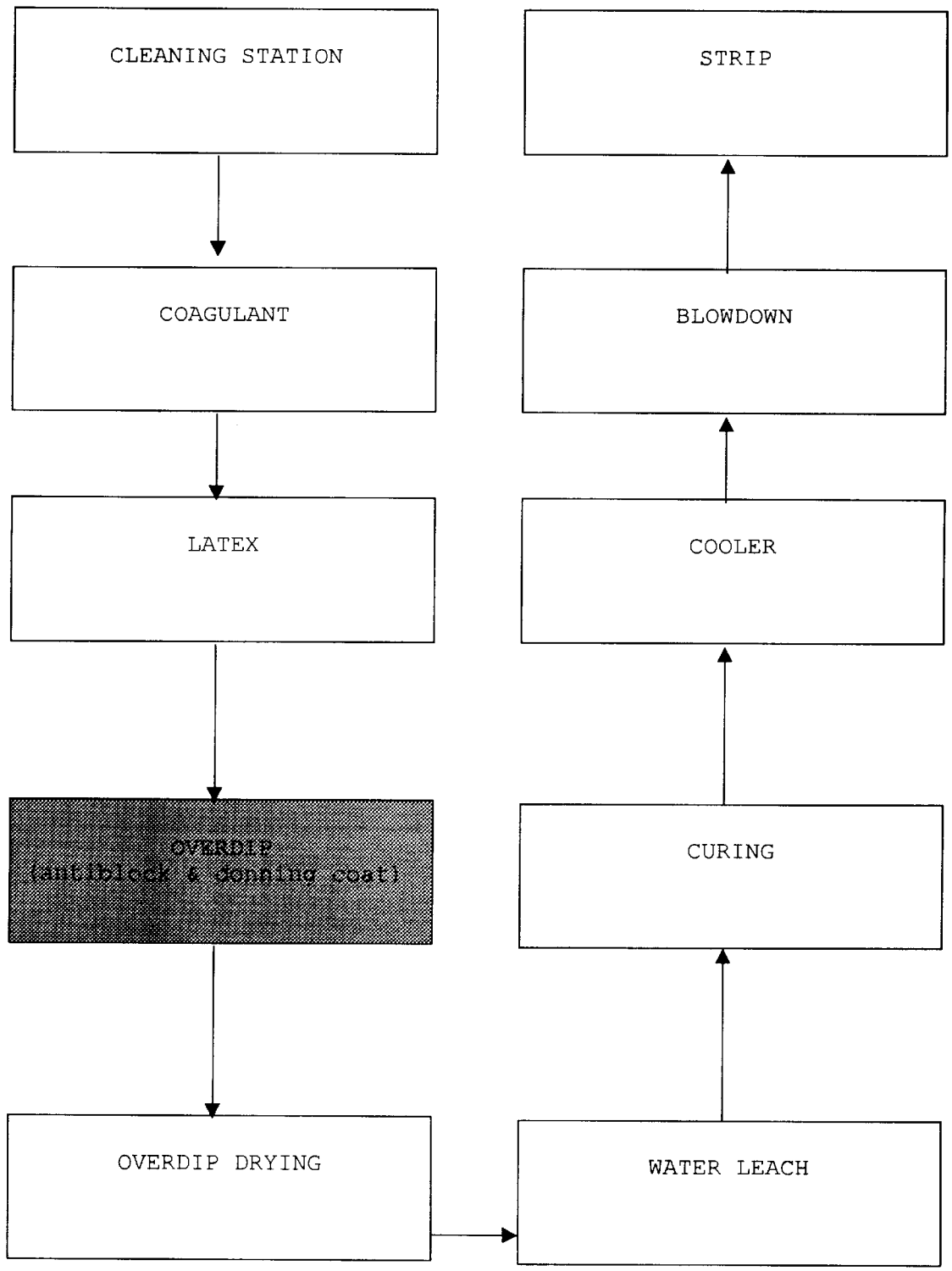

POWDER-FREE MEDICAL GLOVES

FIELD OF INVENTION

The invention relates to a medical glove, particularly a powder free medical glove and the method for manufacturing the same.

BACKGROUND OF THE INVENTION

Gloves fabricated from elastomeric materials such as natural rubber latex have suffered from many problems. An important criteria for medical gloves is to conform tightly to the hand of the wearer. Natural rubber with its inherent high coefficient of friction properties makes glove donning difficult. Conventional medical gloves usually have a lubricant on the inner surface to provide ease of glove donning. The lubricant used is a powder materials in one form or another and commonly used powder is absorbable starch powder. However, there have been doubts raised against the use of loose dusting powder for surgical procedures as it may be hazardous to health. There are fears that dusting powder may cause granuloma and other post operative complications. Therefore many efforts were made to reduce or eliminate the use of loose powder to facilitate the donning of medical gloves by developing various methods to improve the donning properties.

Examples of methods of manufacturing medical gloves have been described in U.S. Pat. No. 44,991,541, U.S. Pat. No. 5,088,125, U.S. Pat. No. 1,398,552, U.S. Pat. No. 5,284,607 and U.S. Pat. No. 4,143,109.

U.S. Pat. No. 4,499,154 describes the use of a lubricant, particularly a hydrogel, of which is polymer bonded to inner surface of the medical gloves followed by the application of a surfactant to improve the glove lubricity for donning.

U.S. Pat. No. 5,088,125 describes the manufacture of medical gloves involving the application of a blend of anionic polyurethane and a second polymer. The US Patent 1,398,552 further describes the application of vinyl chloride-alkyl acrylate copolymer or a vinyledene chloride-alkyl acrylate copolymer in order to improve glove lubricity.

U.S. Pat. Nos. 4,143,109 & 5,284,607 describes the application of a particle containing composition to bond to the gloves. The particles may comprise of any variety of acid-resistant composition such as crosslinked cornstarch, polyurethane etc.

It is an object of the present invention to provide an alternative to the above kinds of medical gloves. In particular the invention seeks to provide a medical glove, of natural or synthetic latex polymer having an anti-blocking composition on the surface contacting layer which is novel over above said prior art which involve the use of three components comprising of a polymer/copolymer, a micronised high density polyethylene and a wax and which could be applied in the method of making medical gloves. it is also another object of the invention to provide a novel coating composition of which is applicable to other types of elastomeric articles such as clean room gloves, condoms, caps, catheters, sheets and sheet-type incontinence devices.

SUMMARY OF THE INVENTION

In accordance with this invention, there is provided a powder free medical glove produced from natural or synthetic polymer comprising an outer side a silicone treated surface and the inside of the glove bonded with a layer formed of an anti-blocking composition of a polymer/copolymer choosen from polyether polyurethane, vinylidene chloride-alkyl acrylate and/or natural rubber polymer, a high density polyethylene of micronised form and a wax which is a mixture of carnauba and paraffin wax and a method of making the same.

BRIEF DESCRIPTION OF THE DRAWING

FIG. 1 illustrtes a flowchart of a dipping process of making powder free medical gloves in accordance with the invention.

DETAILED DESCRIPTION OF THE INVENTION

As illustrated in the flow chart of FIG. 1, firstly a clean glove form which is the mould is immersed into a coagulant solution. The solution contains the latex coagulating salts and some insoluable powder for example calcium carbonate which facilitate glove release and stripping after completion of glove drying. The coagulating salt used typically contain calcium salts dissolved in an aqueous or alcohol media.

The next step involves forming a second layer which is dipping the coagulant coated form into a natural rubber latex (or synthetic latex) compound. The latter could have been partially or fully vulcanised. On contact with the coagulating salts, the latex forms a gel, the thickness of which depends on the calcium salt concentration, dwell time, total solids of the latex compound and many other factors. Typically, for medical, gloves the process and parameters are controlled to give glove thickness ranging from 0.10–0.40 millimetres.

Next, an anti-blocking composition which is the present invention comprising a mixture of polymer/copolymer, micronised high density polyethylene and wax is then dip-coated over the latex gel to form a third layer. The anti-blocking layer that has been coated on the latex gel together with the form are dried at elevated temperatures from 700 C–1400 C to subject the natural rubber to drying/vulcanisation and at the same time to facilitate bonding of the anti-blocking coating to the rubber surface. After the drying process, the fully formed glove is removed from the form and at the same time reversing it, so that the first layer is on the outside of the glove.

Accordingly, the present invention provides a glove in which the inside surface is coated with a anti-blocking composition comprising of three components-a polymer/copolymer, a micronised high density polyethylene particle and a wax. The combination of the three are necessary to impart superior anti-blocking and lubricity characteristics to the glove and such a coating composition was not described in the prior art. Blocking refers to the tendency of glove surfaces to stick together. The above said blend compositions prevent blocking.

An example of a polymer/copolymer used is an anionic aliphatic polyether polyurethane such as Neorez R-987 by Zeneca Resins, Netherlands. While the basic polymer coating provides good flexible adhesion to such product as medical glove, the coating does not provide a lubricious surface to the coated surface. However, with the right amount of high density polyethylene particle added into the flexible polyurethane polymer, the coating becomes more lubricious and the medical glove is much easier to don. The inherent low coefficient of friction properties of the high density polyethylene particles improves the lubricity of the polymer coating. The high density polyethylene material as described in this invention is available in micronised form. An example is Acumist B6 supplied by Allied Signal (USA). The material has a particle size range from 2–12 microns. At high temperatures of drying (118° C.–137° C.), the polyethylene particles melt and blend into the coating. Further improvement in lubricity, film coherence and smoothness, are achieved when a third component, a wax is present in the composition. one example of a wax is a mixture of carnauba wax/paraffin wax available as Michemlube ML180 from Michelman Inc., Ohio, USA.

Another embodiment of the present invention provides the coating of the glove with a position based on a copolymer of vinylidene chloride/methyl acrylate, Viclan VL801 supplied by Zeneca Resins. While the basic polymer coating is adequate in providing anti-blocking properties to the coated article like glove, the latter when stretched to certain extent, as normally encountered in a product such as medical glove caused the polymer to develop a cobblestone effect. This is an undesirable feature for the coating. Although lubricity is improved, the glove donning characteristic is still inadequate compared to powdered gloves. In the present invention, a composition comprising of the Copolymer Viclan VL 801 and combined with high density polyethylene particles and carnauba wax as described above resulted in coatings with good properties in film coherence, adhesion and lubricity for donning.

Another embodiment of the present invention is to use a natural rubber polymer in place of the vinylidine chloride methyl acrylate copolymer or polyurethane. Inherently, natural rubber is well known to have good blocking and a high coefficient of friction properties which make natural rubber gloves, without further treatment, difficult to don. In the lo present invention, compositions comprising natural rubber, high density polyethylene homopolymer particles and carnauba wax, as described above resulted in coatings with good anti-blocking properties and lubricity for donning. The present invention is now further described in the following examples:

EXAMPLE 1

A clean glove form is immersed in a 20 percent calcium nitrate coagulant solution containing calcium carbonate as the mould release powder. The form with the layer of salt is next immersed in a 33 percent natural rubber latex dipping solution and the dwell time is controlled such that latex layer deposited on the form has an average thickness of 180 micrometers. The form with the latex layer is next dipped into the following antiblocking composition.

|  | Parts by weight |
|---|---|
| Neorez R-987, 40% | 90 |
| Acumist B6, 20% | 90 |
| Michemlube ML180, 25% | 36 |
| Water | 384 |

The latex layer is now coated with a thin layer of the is antiblocking composition. At the next stage of drying in the ovens at 70° C.–140° C., the two layers are bonded together. During stripping, the glove is removed from the form in such a manner that reverses the glove, resulting in the antiblocking coating becoming the inside (donning) surface. By washing and rinsing the glove in water several times and finally treating the glove with a silicon/wax solution, a glove relatively free of powder with superior donning properties can be produced. The resulting glove is soft and has high strength and extendability as demonstrated in its elongation at break of over 800%, tensile strength exceeding 24 MPA and modulus at 500% elongation of less than 3 MPa. Good strength properties are retained even after subjecting to heat ageing condition of seven (7) days at 70° C. in hot air oven.

The TSC of overdip compound of PU/HDPE/Wax as a medical glove coating is generally prepared in the range between 1.5% to 10.5% mantaining the same composition ratio of the component materials as described in Example I.

The preferred range of dipping solids is between 2.5–8.50%. The most preferred dipping solids for the best donning and antiblocking properties is between 4.0% to 7.0%.

EXAMPLE II

In accordance with Example I, a glove is produced by dipping the latex gel layer with the following anti-blocking coating composition as described below:

|  | Parts by weight |
|---|---|
| Viclan VL-801, 54% | 56 |
| Acumist B6, 20% | 45 |
| Michemlube ML180, 25% | 36 |
| Water | 463 |

The coated glove has good antiblocking property and lubricity in donning. The glove is soft and has high strength and extendability as demonstrated by its elongation of over 800%, tensile strength exceeding 24. OMPa and modulus at 500% elongation of less than 3 MPa. The glove has good ageing resistance when subjected to hot air ageing, seven (7) days at 70° C.

The TSC of overdip compound of Copolymer/HDPE/Wax as a medical glove coating is generally prepared in the range between 1.5% to 8.0% maintaining the same composition ratio of the component materials as described in Example II.

EXAMPLE III

In accordance with Example I, a glove is produced by dipping the latex gel layer with the following coating composition.

|  | Parts by weight |
|---|---|
| NR latex compound, 33% | 91 |
| Acumist B6, 20% | 75 |
| Michemlube ML180, 25% | 12 |
| Water | 122 |

The glove has good antiblocking, ease of donning has a soft feel and is high elongation and good strength. A glove substantially free of loose powder; can be produced by washing using the glove with water and finally treating with silicon emulsion and drying.

The TSC of overdip compound of NR/HDPE/Wax as a medical glove coating is generally prepared in the range between 10% to 20% maintaining the same composition ratio of the component materials as described in Example III.

The medical gloves produced from these examples are tested for donnability and the results obtained from said test is shown below.

| Item | Dry Donning | Wet Donning | Double Donning |
|---|---|---|---|
| PVDC/MA/HDPE/ML180 Ratio: 5:1:1 | 5 | 3–4 | 5 |
| NR/HDPE/ML180 Ratio: 10:4:1 | 4 | 3 | 4 |
| 987/HDPE/ML180 Ratio 4:2:1 | 5 | 4 | 5 |

Dry donning refers to wearing glove on a dry hand, wet donning refers to wearing gloves when hand is wet and double donning refers to wearing one glove on top of another. The ratings used in this experiment 1,2,3,4 and 5 denotes poor, average, satisfactory, good and excellent donnability.

R987/HDPE/ML180 was the best combination interms of both dry and wet donning and double donning. The results shows that various combination involving HDPE as an addition is important in reducing the coefficient of friction of the coating formulation used as overdip on the NR latex glove.

The role of the primary resin or rubber such as PVDC/MA latex, NR latex and R-987 (polyether based) urethane latex was as an aquoeus media for the HDPE powder in order to be evenly distributed across the surfaces of the NR latex glove film. If these resins or NR latex has lower coefficient of fraction, it will only help to boost up donning.

The presence of ML 180 (Carnauba Wax emulsion) was also important in giving a good levelling of HDPE powder onto rubber film surfaces and prevents the HDPE being broken down into dusty powder after curing.

R-987/HDPE/ML 180 overdip combination will give good film coverage and no cobblestone effect and ease of handling because of its water base nature. The good wet slip properties will be useful for surgeons glove.

The gloves were further subjected to blocking assessment to evaluate the degree of stickiness of said glove. About 100 pieces of gloves produced from the above described examples were packed in a dispenser box. The samples were put into a carton of 1,000 pcs (10 boxes) and subject the whole carton to heat at 70° C. for 7 days of accelerated ageing. Later, the carton is removed and it was cooled to room temperature. The stickiness of the glove is evaluated by pulling away the gloves from the box and observing the tendency of them to stick together. The results of this test for all three examples shows that the gloves do not show any sign of blocking.

The invention being thus described, it will be obvious that the same may be varied in many ways. It should now be obvious to a person skilled in the art that such variations are not to be regarded as a departure from the principles as herein described in the following claims.

We claim:

1. A process for making a powder-free medical glove comprising the steps of:

(i) forming the glove by dip-coating a first layer onto a glove form into a solution comprising a coagulant and glove-release powders;

(ii) forming a second layer over the first layer by dip-coating the glove form into an elastomer;

(iii) forming a third layer over the second layer by dip-coating over the elastomer layer an antiblocking composition comprising a polymer/co-polymer, a high density polyethylene particle and a wax to form an antiblocking layer;

(iv) dip-coating a silicone emulsion over the underlying layers;

(v) subjecting the formed layers to heat to crosslink the elastomer and to bond the elastomer layer to the antiblocking layer, the heating melting the high density polyethylene particles;

(vi) removing the finished glove from the form and reversing the same so that the first layer becomes the outer side of the glove whereas the silicone-treated underlying layers become the inner side of the glove;

(vii) lashing and rinsing the finished glove;

(viii) treating the finished glove with a silicone emulsion/wax mixture; and (ix) drying the glove.

2. A method according to claim 1, in which heating the formed layers is done at 110° C.–140° C.

3. A method according to claim 1, wherein the antiblocking composition comprises of 55–60% polyether polyurethane, 25–30% micronised high density polyethylene with a particle size of 6 micron and 10–15%. carnauba and paraffin wax.

4. A method according to claim 1, wherein the antiblocking composition comprises of a 60–65% vinylidene chloride-alkyl acrylate copolymer, 17–20% micronised high density polyethylene and 17–20% carnauba and paraffin wax.

5. A method according to claim 1, wherein the antiblocking composition comprises of a 60–70% natural rubber polymer, 25–35% micronised high density polyethylene and 6–12% carnauba and paraffin wax.

6. A method according to claim 1, wherein the micronised high density polyethylene particles have a particle size of 2–12 microns and melting point of between 118° C.–137° C.

* * * * *